(12) United States Patent
Nishizawa et al.

(10) Patent No.: US 11,648,974 B2
(45) Date of Patent: May 16, 2023

(54) STEERING SUPPORT

(71) Applicant: FUTABA INDUSTRIAL CO., LTD., Okazaki (JP)

(72) Inventors: Norito Nishizawa, Okazaki (JP); Masahiro Hayakawa, Toyota (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 17/159,454

(22) Filed: Jan. 27, 2021

(65) Prior Publication Data

US 2021/0253154 A1 Aug. 19, 2021

(30) Foreign Application Priority Data

Jan. 28, 2020 (JP) .............................. JP2020-011530

(51) Int. Cl.
 *B62D 1/16* (2006.01)
(52) U.S. Cl.
 CPC ...................................... *B62D 1/16* (2013.01)
(58) Field of Classification Search
 CPC ......... B62D 1/16; B62D 25/145; B62D 25/14
 See application file for complete search history.

(56) References Cited

U.S. PATENT DOCUMENTS

| | | | | |
|---|---|---|---|---|
| 8,393,671 B2* | 3/2013 | Watanabe | ............ | B62D 25/147 296/72 |
| 9,156,488 B1* | 10/2015 | McCabe | .............. | B62D 25/145 |
| 2001/0024035 A1* | 9/2001 | Scheib | ............... | B60H 1/00564 280/771 |
| 2002/0117842 A1* | 8/2002 | Takano | ..................... | B62D 1/16 280/779 |
| 2005/0093285 A1* | 5/2005 | Lee | ........................... | B62D 1/16 280/779 |
| 2010/0019480 A1* | 1/2010 | Dornin | ..................... | B62D 1/16 248/230.8 |

(Continued)

FOREIGN PATENT DOCUMENTS

| | | | | |
|---|---|---|---|---|
| EP | 3626588 A1 * | 3/2020 | ............... | B62D 1/16 |
| JP | 2000264225 A * | 9/2000 | | |

(Continued)

OTHER PUBLICATIONS

Kariya Shinichi, 'Machine Translation of JP 2001270467 Obtained Mar. 8, 2022', Oct. 2, 2001, Entire Document. (Year: 2001).*

(Continued)

*Primary Examiner* — Karen Beck
*Assistant Examiner* — Scott F. Underwood
(74) *Attorney, Agent, or Firm* — Withrow & Terranova, P.L.L.C.; Vincent K. Gustafson

(57) ABSTRACT

A steering support includes a body portion provided with an internal space, and first and second fastening portions. The first fastening portion is provided to form a first steering fastening portion configured to fasten the body portion and a steering of a vehicle. The second fastening portion is provided to form a miscellaneous member fastening portion configured to fasten the body portion and a miscellaneous member of the vehicle. At least part of the first steering fastening portion and at least a part of the miscellaneous member fastening portion are located on a substantially straight line that passes through the internal space.

11 Claims, 5 Drawing Sheets

(56) References Cited

U.S. PATENT DOCUMENTS

| | | | |
|---|---|---|---|
| 2010/0090451 A1* | 4/2010 | Atsumi | B62D 25/145 |
| | | | 280/779 |
| 2011/0227369 A1* | 9/2011 | Abe | B62D 21/15 |
| | | | 296/193.02 |
| 2013/0076016 A1 | 3/2013 | Aoki | |
| 2018/0099689 A1 | 4/2018 | Kurita et al. | |
| 2018/0099699 A1* | 4/2018 | Kurita | B62D 1/16 |
| 2019/0225280 A1* | 7/2019 | Nishizawa | B62D 25/145 |

FOREIGN PATENT DOCUMENTS

| | | | | |
|---|---|---|---|---|
| JP | 2001270467 A | | 10/2001 | |
| JP | WO2011155031 A1 | | 8/2013 | |
| JP | 2016094173 A | * | 5/2016 | ........... B62D 25/081 |
| JP | 2017094763 A | | 6/2017 | |
| JP | 2018062234 A | | 4/2018 | |
| JP | 2020125002 A | * | 8/2020 | |
| WO | 2011155031 A1 | | 8/2013 | |

OTHER PUBLICATIONS

Asano K, 'Machine Translation of JP 2000264225 A Obtained Jun. 17, 2022', Sep. 26, 2000, Entire Document. (Year: 2000).*

Notice of Reasons for Refusal for Japanese Patent Application No. 2020011530, dated Jun. 28, 2022, 10 pages.

Notice of the First Patent Examination Opinion for Chinese Patent Application No. 202110114718.3, dated Oct. 11, 2022, 15 pages.

* cited by examiner

STEERING SUPPORT

CROSS-REFERENCE TO RELATED APPLICATIONS

This application claims the benefit of Japanese Patent Application No. 2020-11530 filed on Jan. 28, 2020 with the Japan Patent Office, the entire disclosure of which is incorporated herein by reference.

BACKGROUND

The present disclosure relates to a steering support that supports a steering of a vehicle from above.

A driver side portion in an instrument panel reinforcement disclosed in Japanese Unexamined Patent Application Publication No. 2001-270467 is configured as a steering support. The driver side portion has a first end fastened to an end portion of a passenger side pillar extending in a vehicle-width direction, and a second end fastened to a driver side pillar. The driver side portion is provided with a wide area portion and a pipe portion. The wide area portion extends in a front-rear direction of a vehicle in the vicinity of the first end, and the pipe portion extends toward the wide area portion from the second end.

The wide area portion is hollow, and is provided with an opening facing diagonally downward on a rear side. A nut is provided to a rim surrounding the opening. A steering is fastened to the wide area portion by the nut. The second end of the driver side portion is provided with a flange on a front side and a rear side of the pipe portion. These flanges are provided with a bolt insertion hole. The bolt insertion hole allows fastening of the second end to the driver side pillar.

In the driver side portion, the wide area portion and the pipe portion have a hollow part, and rigidity of the hollow part is relatively high. Since an external force applied to an object is transmitted through a part of the object having high rigidity, the external force applied to the driver side portion is mainly transmitted through the hollow part of the wide area portion and the pipe portion.

SUMMARY

In the driver side portion, the external force applied from the steering is transmitted to the second end through the hollow part of the wide area portion and the pipe portion. The external force that has reached the second end is transmitted to the pillar fastened to the flanges provided on the front side and the rear side of the pipe portion via the flanges. When the external force is transmitted to the flanges through the hollow part of the pipe portion at the second end, however, the external force largely changes its direction of transmission. Thus, the external force is not smoothly transmitted to the pillar, and rigidity of the driver side portion is reduced. As a result, the driver side portion receives a local stress, and rigidity of the steering support may be deteriorated.

In one aspect of the present disclosure, it is preferable that rigidity of a steering support is improved.

One aspect of the present disclosure relates to a steering support mounted on a vehicle to extend in a vehicle-width direction and configured to support a steering of the vehicle from above. The steering support comprises a body portion, a first fastening portion, and a second fastening portion. The body portion is formed by joining plate materials having specified shapes, and has an internal space extending in the vehicle-width direction between the plate materials. The first fastening portion is provided in the body portion to form a first steering fastening portion. The first steering fastening portion contacts the internal space, and is configured to fasten the body portion and the steering. The second fastening portion is provided in the body portion to form a miscellaneous member fastening portion. The miscellaneous member fastening portion contacts the internal space, and is configured to fasten the body portion and a miscellaneous member of the vehicle. At least a part of the first steering fastening portion and at least a part of the miscellaneous member fastening portion are located on a substantially straight line that passes through the internal space.

According to the configuration above, the first steering fastening portion and the miscellaneous member fastening portion contact the internal space. For this reason, an external force inputted from the first steering fastening portion is urged to be transmitted to the miscellaneous member fastening portion through a hollow part of the body portion. At least a part of the first steering fastening portion and at least a part of the miscellaneous member fastening portion are located on the substantially straight line that passes through the internal space. Therefore, when the external force is transmitted from the first steering fastening portion to the miscellaneous member fastening portion through the hollow part of the body portion, a transmission path of the external force is urged to be straight, and a change in transmission direction of the external force is inhibited. This makes transmission of the external force more smooth, and can reduce a local stress on the steering support. Thus, rigidity of the steering support is improved.

The first steering fastening portion may fasten the body portion and the steering by at least one penetration member that penetrates the body portion and the internal space.

According to the configuration above, the body portion and the steering can be favorably fastened.

The body portion may be formed by joining members including a lower body member and an upper body member. The lower body member may be located on a lower side of the internal space, and the upper body member may face the lower body member across the internal space. The first steering fastening portion may fasten the body portion and the steering by at least one penetration member that penetrates the lower body member and the upper body member, and the internal space.

According to the configuration above, the body portion and the steering can be favorably fastened.

The miscellaneous member may be a pillar of the vehicle.

According to the configuration above, transmission of the external force from the first steering fastening portion to a fastening portion with the pillar becomes smooth. The local stress on the steering support can be reduced. Thus, rigidity of the steering support is improved.

The miscellaneous member may be a steering member mounted on the vehicle to extend in the vehicle-width direction.

According to the configuration above, transmission of the external force from the first steering fastening portion to a fastening portion with the steering member becomes smooth. The local stress on the steering support can be reduced. Thus, rigidity of the steering support is improved.

The steering support may further comprise a third fastening portion provided in the body portion to form a floor brace fastening portion. The floor brace fastening portion contacts the internal space and is configured to fasten the body portion and a floor brace. The floor brace is an elongated member projecting from a portion of a body of the vehicle located below the steering support. At least a part of the first steering fastening portion and at least a part of the floor brace fastening portion may be located on a substantially straight line that passes through the internal space.

According to the configuration above, the external force inputted from the first steering fastening portion is urged to be transmitted to the floor brace fastening portion through the hollow part of the body portion. At least a part of the first steering fastening portion and at least a part of the floor brace fastening portion are located on the substantially straight line that passes through the internal space. Therefore, when the external force is transmitted from the first steering fastening portion to the floor brace fastening portion through the hollow part of the body portion, the transmission path of the external force is urged to be straight, and the change in transmission direction of the external force is inhibited. This makes transmission of the external force more smooth, and can reduce the local stress on the steering support. Thus, rigidity of the steering support is improved.

The body portion may be formed by joining members including a lower body member and an upper body member. The lower body member may be located on a lower side of the internal space, and the upper body member may face a lower part of the body portion across the internal space. The third fastening portion may be provided in the lower body member.

According to the configuration above, the steering support and the floor brace can be fastened closer to a fastening position of the floor brace and the body of the vehicle. Therefore, rigidity of the steering support and the floor brace can be improved.

The body portion may further comprise a bottom surface portion that is located on the lower side of the internal space, and expands along a reference bottom surface that is a virtual plane. Two virtual planes that intersect on an upper side of the bottom surface portion may be a reference front surface and a reference rear surface. The reference bottom surface, the reference front surface, and the reference rear surface may form a triangular section orthogonal to the vehicle-width direction, and the body portion may have a front surface portion expanding along the reference front surface and a rear surface portion expanding along the reference rear surface.

According to the configuration above, deformation of the front surface portion and the rear surface portion in the body portion can be inhibited. Rigidity of the body portion can be improved.

A portion of the body portion located substantially in the center in the vehicle-width direction may be a body central portion. The steering support may further comprise a projecting portion. The projecting portion is provided in the body central portion to project to a front side of the vehicle. The projecting portion has a second steering fastening portion configured to be fastened to the steering. An end on the front side in the body central portion may be located closer to the front side than the second steering fastening portion.

According to the configuration above, the body central portion can have an increased width. The width of the body central portion means a length of the body central portion in a front-rear direction of the vehicle. Thus, a sufficient area of a joint portion of the body central portion with the projecting portion can be secured, and the projecting portion can be joined to the body central portion more strongly. Since the body central portion has an increased width, rigidity of the body portion is improved.

A portion of the body portion located substantially in the center in the vehicle-width direction may be a body central portion. The steering support may further comprise a projecting portion. The projecting portion is provided in the body central portion to project to the front side of the vehicle. The projecting portion has a second steering fastening portion configured to be fastened to the steering. The first steering fastening portion may fasten the body portion and the steering by at least one penetration member that penetrates the body portion and the internal space. The projecting portion may be joined to the body portion by the at least one penetration member.

According to the configuration above, joint strength between the projecting portion and the body portion can be improved, while an increase in the number of components is reduced.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

Figure 1:
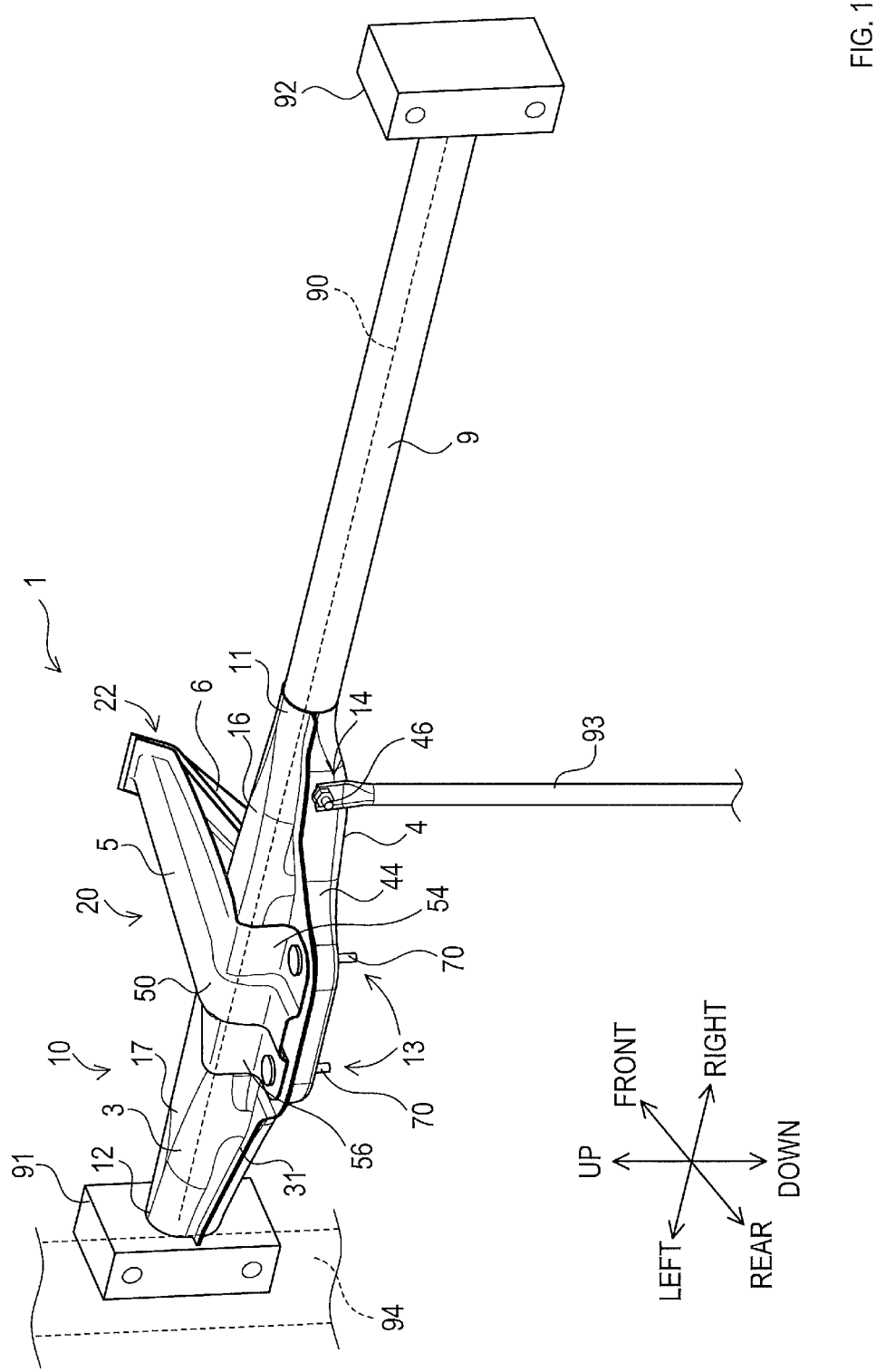
FIG. 1 is a perspective view of a steering support.

The present disclosure is not limited to the following embodiments and can take various modes within the technical scope of the present disclosure.

1. Overall Configuration

A steering support 1 of the present embodiment is formed, for example, of a steel material, and is mounted on a vehicle to extend in a vehicle-width direction (in other words, a right-left direction in the vehicle) (see FIGS. 1 to 7). Hereinafter, front, rear, right, and left of the vehicle will be simply described as front, rear, right, and left. The center in the right-left direction will be simply described as center.

A left end of the steering support 1 is fastened to a driver side pillar 94 via a bracket 91. The driver side pillar 94 is a member that forms a body of the vehicle provided near a door on a driver side. A right end of the steering support 1 is fastened to a left end of a steering member 9.

The steering member 9 is a pipe-shaped member forming the body of the vehicle, and is arranged in front of a passenger's seat of the vehicle so as to linearly extend in a right-left direction. Hereinafter, a virtual straight line that passes the center of a section in the right-left direction of the steering member 9 is referred to as an axis 90. The axis 90 extends in the right-left direction. A right end of the steering member 9 is fastened to the body (a passenger side pillar, as an example) of the vehicle via a bracket 92. The left end of the steering member 9 is located near the right end of the steering support 1. The left end of the steering member 9 may be located in a central portion or a left side portion of the steering support 1, for example.

Figure 8:
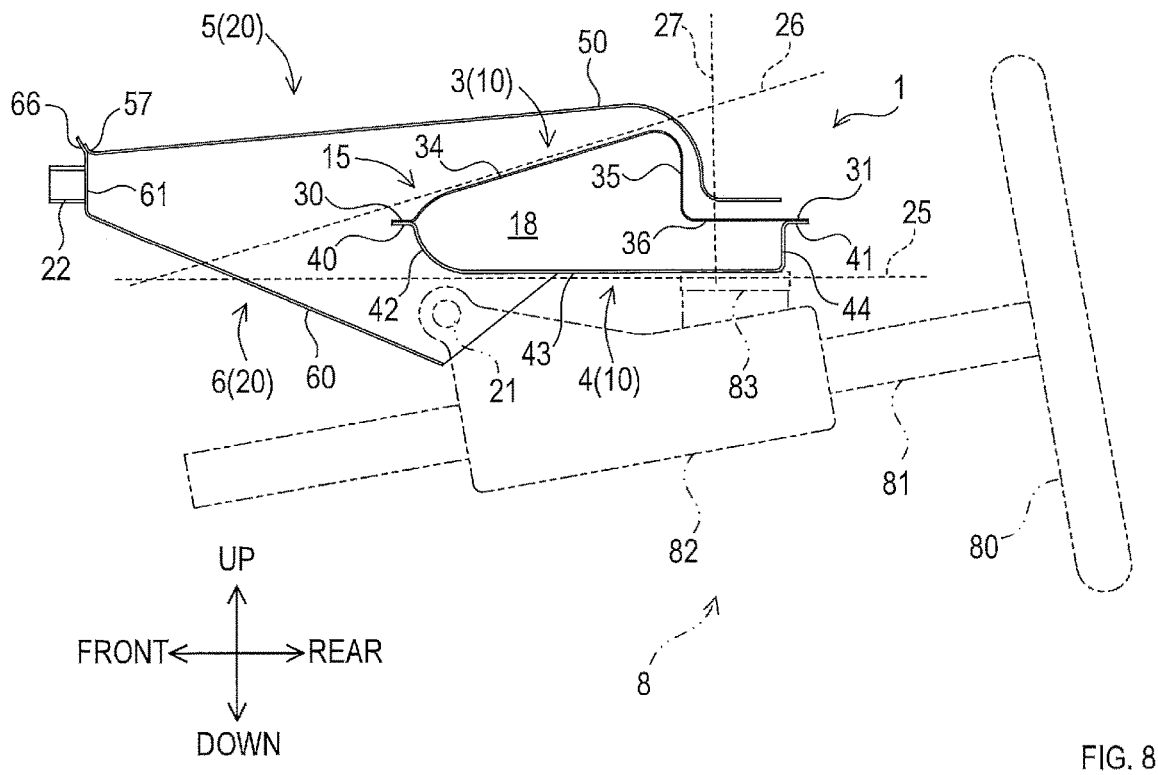
FIG. 8 is a sectional view taken along a line VIII-VIII in FIG. 4.
Figure 9:
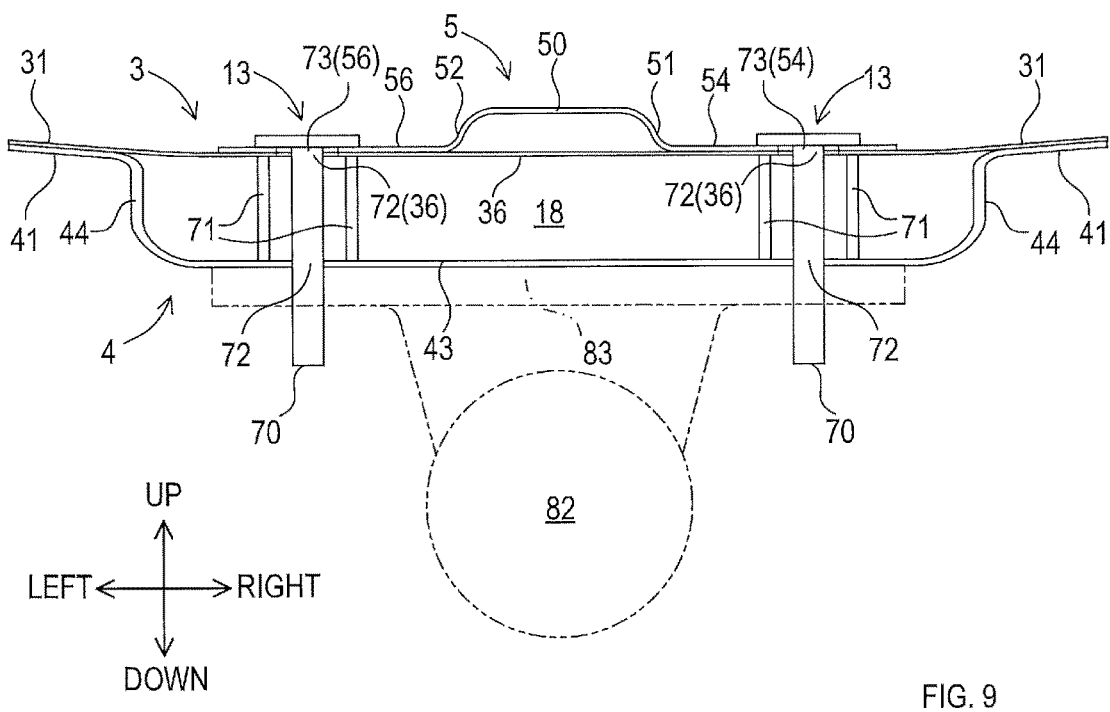
FIG. 9 is a sectional view taken along a line IX-IX in FIG. 2.

The steering support 1 supports a steering column 82 in the steering 8 from above (see FIGS. 8 and 9). The steering column 82 surrounds an outer-circumferential surface of a steering shaft 81 that transmits a rotation operation with respect to a steering wheel 80 to a steering mechanism.

The steering support 1 comprises a body portion 10, a projecting portion 20, a first steering fastening portion 13, a second steering fastening portion 21, a right end portion 11, a left end portion 12, a floor brace fastening portion 14, and a body fastening portion 22.

2. Body Portion

The body portion 10 is a hollow part provided to extend in the right-left direction, and expands in a substantially front-rear direction (hereinafter, also referred to as width direction) (see FIGS. 1 to 8). The body portion 10 comprises an upper body member 3 and a lower body member 4 that are plate materials formed into specified shapes by press molding, etc.

The upper body member 3 and the lower body member 4 extend from a right end to a left end of the body portion 10 and expand in the width direction of the body portion 10. The upper body member 3 comprises a front flange 30 located on a front side edge, and a rear flange 31 located on a rear side edge. The lower body member 4 comprises a front flange 40 located on a front side edge, and a rear flange 41 located on a rear side edge. A portion of the upper body member 3 between the front flange 30 and the rear flange 31 forms a groove-like portion projecting to an upper side. A portion of the lower body member 4 between the front flange 40 and the rear flange 41 forms a groove-like portion projecting to a lower side.

The upper body member 3 is arranged on the upper side, and the lower body member 4 is arranged on the lower side. The body portion 10 is formed by joining, for example, by welding, the front flanges 30, 40 to each other, and the rear flange 31, 41 to each other, of the upper body member 3 and the lower body member 4. An internal space 18 is formed between the upper body member 3 and the lower body member 4. The internal space 18 extends from the right end to the left end of the body portion 10.

Hereinafter, a portion located substantially in the center of the body portion 10 is referred to as a body central portion 15. The body central portion 15 is provided with a later-described projecting portion 20. A right side portion and a left side portion of the body central portion 15 (in other words, the projecting portion 20) in the body portion 10 are respectively referred to as a body right portion 16 and a body left portion 17. The body right portion 16 and the body left portion 17 increases in length in the front-rear direction (hereinafter, width) toward the body central portion 15. The body central portion 15 has a width of the body right portion 16 and the body left portion 17 or more.

A right end portion 11 that is a portion on the right end of the body portion 10 and a left end portion 12 that is a portion on the left end of the body portion 10 are substantially cylindrical. Each of the right end portion 11 and the left end portion 12 contacts the internal space 18, and forms an opening that communicates with the internal space 18. The aforementioned axis 90 of the steering member 9 passes through the substantially center of these openings.

3. Upper Body Member

The upper body member 3 comprises the aforementioned front flange 30 and rear flange 31, a right curved portion 32, a left curved portion 33, a front surface portion 34, a rear surface portion 35, and a rear upper surface portion 36 (see FIGS. 1 to 8).

The right curved portion 32 is formed in a portion included in the body right portion 16 of the upper body member 3. The left curved portion 33 is formed in a portion included in the body left portion 17 of the upper body member 3. Each of the right curved portion 32 and the left curved portion 33 expands from a rear side rim of the front flange 30 to a front side rim of the rear flange 31, and is curved in a shape of nearly an arc projecting to the upper side.

The front surface portion 34, the rear surface portion 35, and the rear upper surface portion 36 are formed in a portion included in the body central portion 15 of the upper body member 3.

The front surface portion 34 is a flat portion expanding from the front flange 30 to the rear side, and inclines toward the upper side as it expands toward the rear side.

The rear upper surface portion 36 is a portion expanding flat from the front side rim of the rear flange 31 to the front side. As one example, the rear upper surface portion 36 is substantially orthogonal to an up-down direction. Of course, the rear upper surface portion 36 may be inclined in the front-rear direction and/or the right-left direction. The rear upper surface portion 36 faces a later-described bottom surface portion 43 of the lower body member 4 substantially in the up-down direction.

The rear surface portion 35 is a flat portion expanding from a front side rim of the rear upper surface portion 36 to a rear side rim of the front surface portion 34. As one example, the rear surface portion 35 is substantially orthogonal to the front-rear direction.

4. Lower Body Member

The lower body member 4 comprises the aforementioned front flange 40 and rear flange 41, a front side portion 42, the bottom surface portion 43, and a rear side portion 44 (see FIGS. 1 to 8).

The front side portion 42 and the rear side portion 44 are wall-like portions respectively projecting from the rear side rim of the front flange 40 and the front side rim of the rear flange 41 to the lower side. The front side portion 42 is curved in an orientation going around the axis 90. In a portion of the lower body member 4 forming the body right portion 16 and the body left portion 17, the rear side portion 44 is curved in an orientation going around the axis 90. In a portion of the lower body member 4 forming the body central portion 15, the rear side portion 44 expands substantially flat.

The bottom surface portion 43 is a flat portion substantially orthogonal to the up-down direction, and expands from a lower side rim of the front side portion 42 to a lower side rim of the rear side portion 44. Of course, the bottom surface portion 43 may be inclined in the front-rear direction and/or the right-left direction. The bottom surface portion 43 is provided in a portion of the lower body member 4 that does not form the right end portion 11 and the left end portion 12. That is, a portion of the lower body member 4 forming the right end portion 11 and the left end portion 12 does not have the bottom surface portion 43, and is formed by the front side portion 42 and the rear side portion 44 so that a section orthogonal to the right-left direction has a semicircular shape.

5. Truss Structure

The aforementioned bottom surface portion 43 of the lower body member 4 expands substantially flat along a reference bottom surface 25 that is a virtual plane (see FIG. 8). Here, two virtual planes that intersect on an upper side of the bottom surface portion 43 are referred to as a reference front surface 26 and a reference rear surface 27. The reference bottom surface 25, the reference front surface 26, and the reference rear surface 27 form a triangular section orthogonal to the right-left direction.

The front surface portion 34 of the upper body member 3 expands substantially flat along the reference front surface 24, and the rear surface portion 35 of the upper body member 3 expands substantially flat along the reference rear surface 27. That is, the body central portion 15 of the body portion 10 has a truss structure in which a section orthogonal to the right-left direction forms a near triangle with the bottom surface portion 43, the front surface portion 34, and the rear surface portion 35.

In the present embodiment, as one example, the reference bottom surface 25 is substantially orthogonal to the up-down direction, the reference front surface 26 inclines so as to stay away from the reference bottom surface 25 toward the rear side, and the reference rear surface 27 is substantially orthogonal to the front-rear direction. However, orientations of the reference bottom surface 25, the reference front surface 26, and the reference rear surface 27 can be determined as appropriate.

In the present embodiment, as one example, a line of intersection between the reference bottom surface 25 and the reference front surface 26 is located closer to the front side than the bottom surface portion 43, and a position in the front-rear direction of a line of intersection between the reference bottom surface 25 and the reference rear surface 27 overlaps with a position in the front-rear direction of the bottom surface portion 43. However, for example, a position in the front-rear direction of the line of intersection between the reference bottom surface 25 and the reference front surface 26 may overlap with the position in the front-rear direction of the bottom surface portion 43. Also, for example, the line of intersection between the reference bottom surface 25 and the reference rear surface 27 may be located closer to the rear side than the bottom surface portion 43. Even in this case, arrangement of the bottom surface portion 43, the front surface portion 34, and the rear surface portion 35 along the reference bottom surface 25, the reference front surface 26, and the reference rear surface 27, respectively, can form the truss structure in the same manner.

6. Projecting Portion

The projecting portion 20 is provided in the body central portion 15 of the body portion 10 so as to project to the front side (see FIGS. 1 to 8). The projecting portion 20 comprises an upper projecting portion 5 and a lower projecting portion 6 which are made from a plate material formed into a specified shape by press molding, etc.

The upper projecting portion 5 comprises an upper extension 50, an upper right wall portion 51, an upper left wall portion 52, an upper right flange 53, and an upper left flange 55, and an upper front flange 57.

The upper extension 50 is arranged in a portion forming the body central portion 15 in the upper body member 3. The upper extension 50 is an elongated portion extending in the front-rear direction. The upper extension 50 is arranged along the rear upper surface portion 36, the rear surface portion 35, and the front surface portion 34 in the upper body member 3, and projects forward from the front surface portion 34. A clearance is formed between the upper extension 50 and the upper body member 3.

The upper right wall portion 51 is a wall-like portion projecting downward from a right end of the upper extension 50, and the upper left wall portion 52 is a wall-like portion projecting downward from a left end of the upper extension 50.

The upper right flange 53 is a flange-shaped portion projecting to the right side from a lower end and a front end of the upper right wall portion 51. The upper left flange 55 is a flange-shaped portion projecting to the left side from a lower end and a front end of the upper left wall portion 52. The upper right flange 53 and the upper left flange 55 are provided from a rear end to a front end of the upper extension 50. Also, a rear side portion of the upper right flange 53 forms a right joint portion 54 that contacts the rear upper surface portion 36, the rear surface portion 35, and the front surface portion 34. A rear side portion of the upper left flange 55 forms a left joint portion 56 that contacts the rear upper surface portion 36, the rear surface portion 35, and the front surface portion 34. Both the right joint portion 54 and the left joint portion 56 have a substantially triangular shape, and are joined to the upper body member 3, for example, by welding, etc.

The upper front flange 57 is a flange-shaped portion projecting to the upper side from the front end of the upper extension 50. The upper front flange 57 connects to the upper right flange 53 and the upper left flange 55.

The lower projecting portion 6 is a portion projecting forward from a portion forming the body central portion 15 in the lower body member 4. The lower projecting portion 6 comprises a lower extension 60, a lower front end portion 61, a lower right wall portion 62, a lower left wall portion 63, a lower right flange 64, a lower left flange 65, and a lower front flange 66.

The lower extension 60 is arranged on a lower side of the upper extension 50 to face the upper extension 50. The lower extension 60 is an elongated portion extending in the front-rear direction. The lower extension 60 inclines in the front-rear direction so as to extend upward toward the front side.

The lower front end portion 61 is a wall-like portion projecting from a front end of the lower extension 60 to the upper side, and facing the front side. The lower front end portion 61 is provided with a later-described body fastening portion 22.

The lower right wall portion 62 is a wall-like portion projecting from right ends of the lower extension 60 and the lower front end portion 61 toward the upper extension 50. The lower left wall portion 63 is a wall-like portion projecting from left ends of the lower extension 60 and the lower front end portion 61 toward the upper extension 50.

The lower right flange 64 is a flange-shaped portion projecting from an upper end of the lower right wall portion 62 to the right side. The lower left flange 65 is a flange-shaped portion projecting from an upper end of the lower left wall portion 63 to the left side. The lower right flange 64 and the lower left flange 65 are each provided from a rear end of the lower projecting portion 6 to the lower front end portion 61.

The lower front flange 66 is a flange-shaped portion projecting from an upper end of the lower front end portion 61 to the upper side. The lower front flange 66 connects to the lower right flange 64 and the lower left flange 65.

A portion including rear ends of the lower right flange 64 and the lower left flange 65 is joined to the bottom surface portion 43 of the lower body member 4, for example, by welding, etc. Also, the lower front flange 66, and a portion located on the rear side of the lower front end portion 61 in the lower right flange 64 and the lower left flange 65 are joined to the upper right, upper left, and upper front flanges 53, 55, and 57 of the upper projecting portion 5, for example, by welding, etc.

7. First Steering Fastening Portion

The first steering fastening portion 13 is provided in the body central portion 15 of the body portion 10 (see FIGS. 1 to 7), and fastens the body portion 10 and the steering 8 (more specifically, a mounting portion 83 of the steering column 82) (see FIGS. 8 and 9). The first steering fastening portion 13 is provided in a rear side portion of the axis 90 in the body portion 10, and contacts the internal space 18.

Specifically, the first steering fastening portion 13 is provided with two bolts 70, two collars 71 corresponding to the respective bolts 70, and four first bolt holes 72. The two bolts 70 are one example of the penetration member that penetrates the body portion 10 and the internal space 18.

Figure 2:
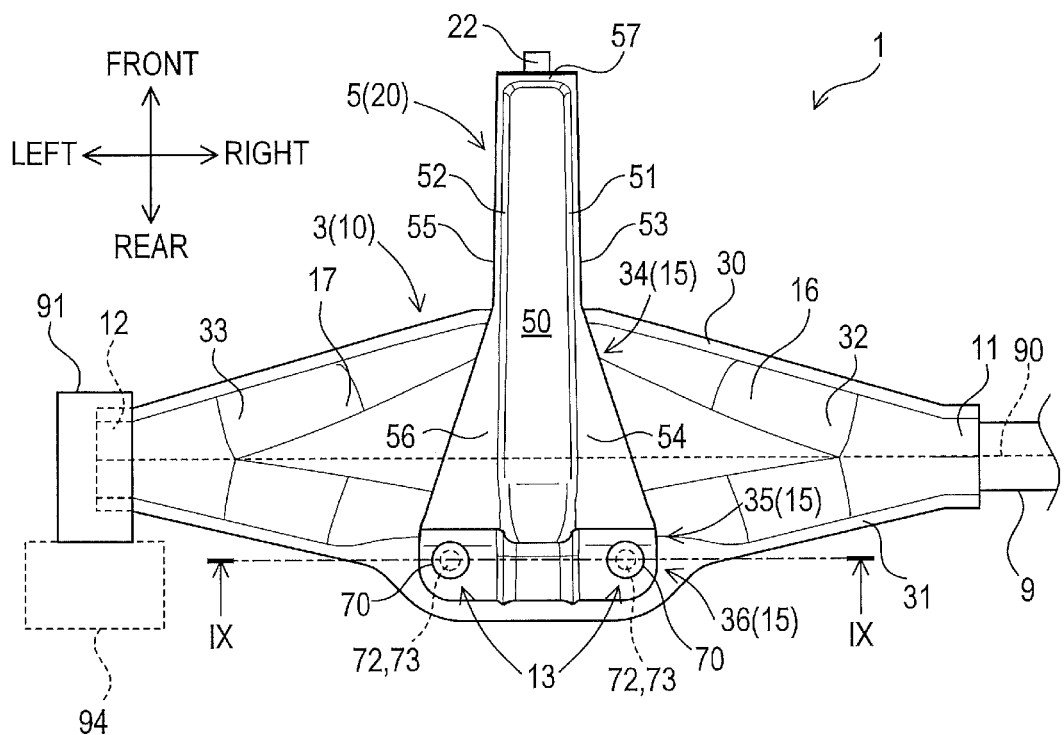
FIG. 2 is a top view of the steering support.
Figure 3:
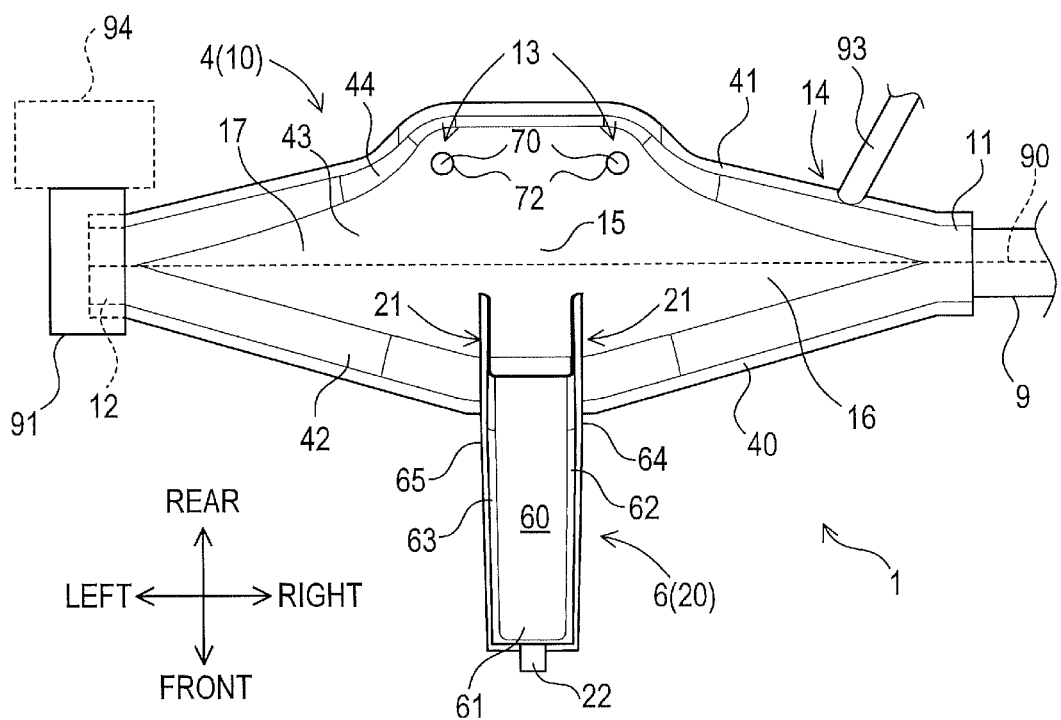
FIG. 3 is a bottom view of the steering support.
Figure 4:
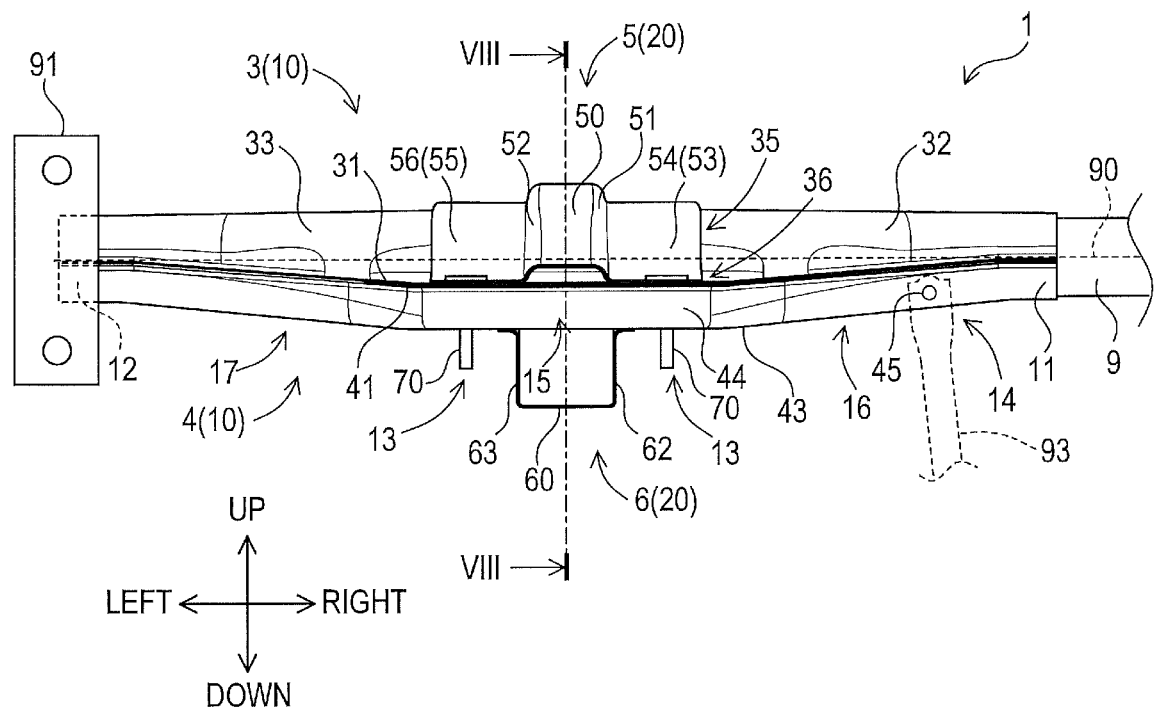
FIG. 4 is a rear view of the steering support.
Figure 5:
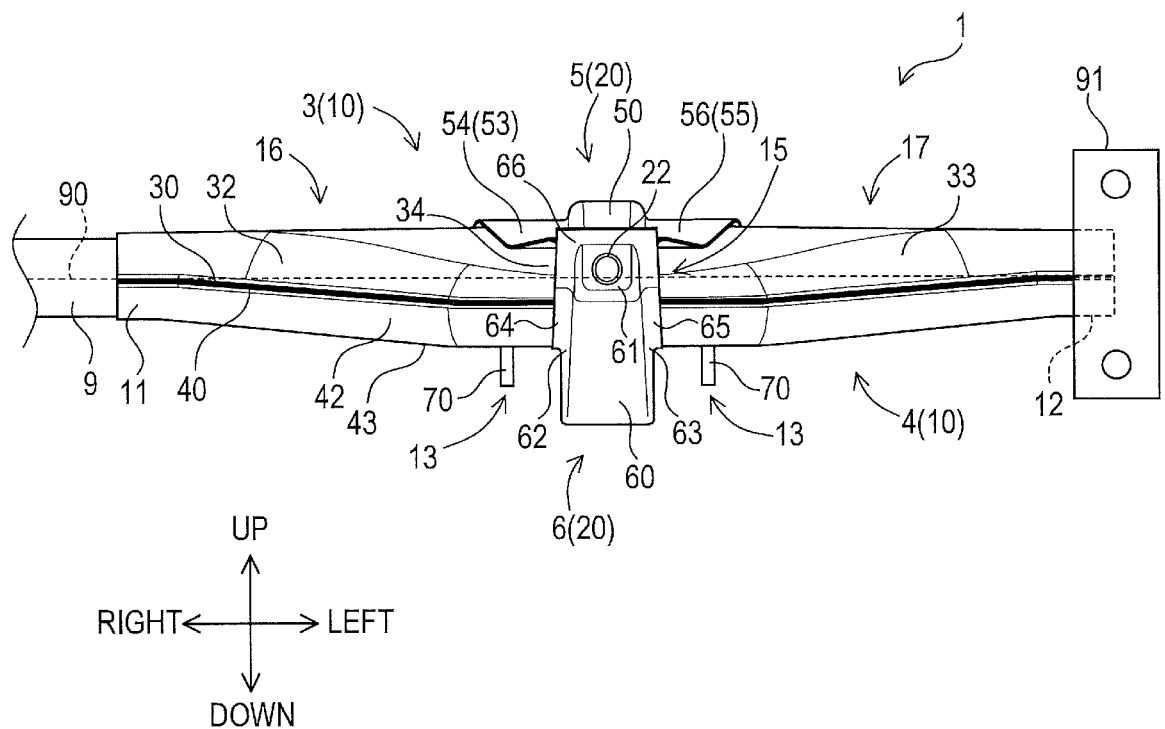
FIG. 5 is a front view of the steering support.
Figure 6:
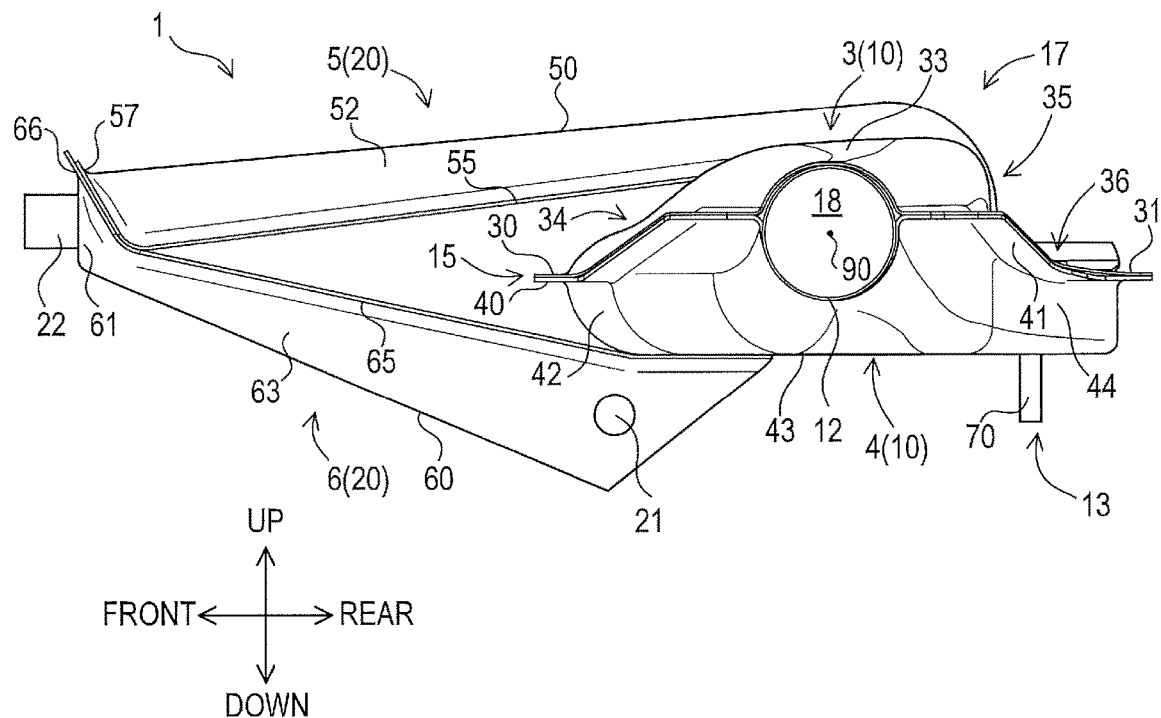
FIG. 6 is a left side view of the steering support.
Figure 7:
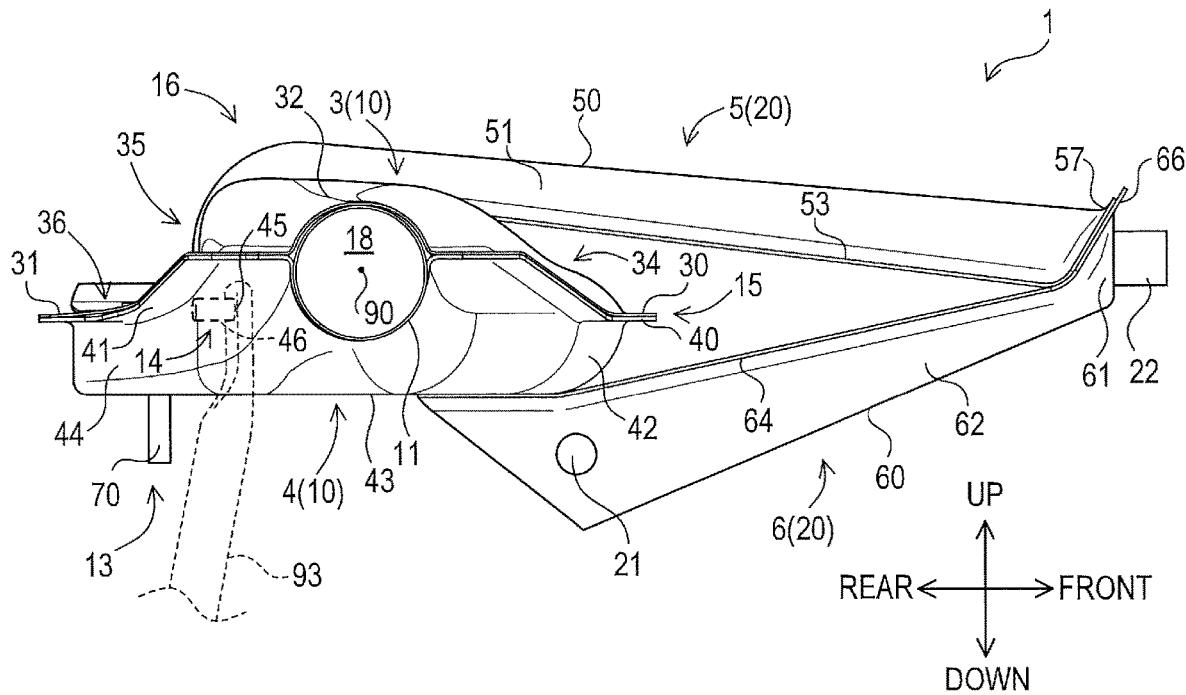
FIG. 7 is a right side view of the steering support.

The two first bolt holes 72 are formed in each of a right side portion and a left side portion substantially across the center of the body portion 10 (see FIGS. 2, 3, and 9). Also, the two first bolt holes 72 are provided in each of the rear upper surface portion 36 of the upper body member 3 and the bottom surface portion 43 of the lower body member 4. The respective first bolt holes 72 of the rear upper surface portion 36 and the respective first bolt holes 72 of the bottom surface portion 43 face each other across the internal space 18. The respective bolts 70, while penetrating the internal space 18, are inserted to the two first bolt holes 72 facing each other, and the bolt holes of the mounting portion 83 of the steering column 82. This fastens the steering 8 to the body portion 10.

The collars 71 extending in the up-down direction corresponding to the respective bolts 70 are arranged in the internal space 18. The collars 71 extend along the bolts 70. Upper ends of the collars 71 contact circumferences of the first bolt holes 72 of the upper body member 3, and lower ends thereof contact circumferences of the first bolt holes 72 of the lower body member 4. The circumferences of the first bolt holes 72 of the upper body member 3 are supported from the lower side by the upper ends of the collars 71. The circumferences of the first bolt holes 72 of the lower body member 4 are supported from the upper side by the lower ends of the collars 71. As one example, the collars 71 are formed in a tubular shape that surround outer-circumferential surfaces of the bolts 70. However, the collars 71 can have various shapes.

Further, in the present embodiment, as one example, the first steering fastening portion 13, together with the steering 8, fastens the upper projecting portion 5. As described above, the right joint portion 54 and the left joint portion 56 of the upper projecting portion 5 contact an upper surface of the rear upper surface portion 36 (see FIGS. 1, 3, 4, and 9). The right joint portion 54 and the left joint portion 56 are each provided with a second bolt hole 73. The respective bolts 70 are inserted to the respective second bolt holes 73 of the right joint portion 54 and the left joint portion 56 and the respective first bolt holes 72 of the rear upper surface portion 36 and the bottom surface portion 43. This fastens the upper projecting portion 5, together with the steering 8, to the body portion 10.

The upper projecting portion 5 may not be fastened by the first steering fastening portion 13. In the first steering fastening portion 13, the body portion 10, the steering 8, and the upper projecting portion 5 may be fastened with one, or three or more bolts.

8. Second Steering Fastening Portion

The second steering fastening portion 21 is configured to be fastened to the steering 8. The second steering fastening portion 21 is provided near rear side ends of the lower right wall portion 62 and the lower left wall portion 63 of the lower projecting portion 6 (see FIG. 8). In the present embodiment, as one example, the second steering fastening portion 21 is formed as two bolt holes that penetrate each of the lower right wall portion 62 and lower left wall portion 63 in the right-left direction.

Specifically, the steering column 82 is arranged between the lower right wall portion 62 and the lower left wall portion 63. By inserting bolts to the bolt holes of the second steering fastening portion 21 and the steering column 82, the steering 8 is fastened to the projecting portion 20.

9. Other Fastening Portions

The right end portion 11 of the body portion 10 in the steering support 1 is fastened to the left end of the steering member 9 (see FIGS. 1 to 5). That is, the left end of the steering member 9 is inserted to the opening of right end portion 11. A rim of the right end portion 11 that surrounds the opening is joined to a left end of the steering member 9 over its entire circumference, for example, by welding, etc. This forms the steering member fastening portion. The steering member fastening portion contacts the internal space 18.

The left end portion 12 of the body portion 10 forms a pillar fastening portion that fastens the body portion 10 to the driver side pillar 94 via a box-shaped bracket 91 (see FIGS. 1 to 5). The pillar fastening portion contacts the internal space 18. That is, the left end portion 12 is inserted to an opening formed in the bracket 91, and the rim that surrounds the opening of the left end portion 12 is joined to the opening of the bracket 91 over its entire circumference, for example, by welding, etc. The bracket 91 is joined to the driver side pillar 94 with at least one bolt that passes through a rear side portion of the bracket 91.

Besides this, for example, by fastening the left end portion 12 to the driver side pillar 94 with at least one bolt that passes through the left end portion 12 so as to penetrate the internal space 18, the pillar fastening portion may be formed by the left end portion 12.

Also, the floor brace fastening portion 14 that fastens the body portion 10 and an upper end of a floor brace 93 is provided near the right end portion 11 in the rear side portion 44 of the lower body member 4 (see FIGS. 1, 3, 4, and 7). The floor brace 93 is an elongated member provided to project upward from a portion located on a lower side of the steering support 1 in the body of the vehicle.

The floor brace fastening portion 14 contacts the internal space 18. The floor brace fastening portion 14 is provided with a third bolt hole 45 that penetrates the rear side portion 44, and a bolt 46. That is, by inserting the bolt 46 to the third bolt hole 45 and a bolt hole at an upper end of the floor brace 93, the body portion 10 and the floor brace 93 are fastened. The bolt 46 inserted to the third bolt hole 45 projects from the rear side portion 44 to the internal space 18.

The body fastening portion 22 that fastens the projecting portion 20 and the body of the vehicle is formed in the lower front end portion 61 in the lower projecting portion 6 (see FIGS. 1 to 3 and 5 to 8). The body fastening portion 22 is a tubular portion projecting from the lower front end portion 61 to the front side. An inner side space of the tubular portion is formed as a bolt hole extending in the front-rear direction. By inserting the bolt to the body fastening portion 22, the lower projecting portion 6 and the body of the vehicle are fastened.

10. Position of Fastening Portion

The bolts 70 and the collars 71 of the first steering fastening portion 13 are provided so as to straddle the internal space 18. The pillar fastening portion (in other words, the left end portion 12), and the steering member fastening portion (in other words, the right end portion 11) are also provided so as to straddle the internal space 18.

At least a part of the first steering fastening portion 13, and at least a part of the pillar fastening portion are located on a substantially straight line that passes through the internal space 18 (see FIGS. 1 to 3). In the present embodiment, as one example, the entire first steering fastening portion 13 and a portion of the pillar fastening portion are located on the substantially straight line.

At least a part of the first steering fastening portion 13 and at least a part of the steering member fastening portion are located on a substantially straight line that passes through the internal space 18 (see FIGS. 1 to 3). In the present embodiment, as one example, the entire first steering fastening portion 13 and a portion of the steering member fastening portion are located on the substantially straight line.

At least a part of the first steering fastening portion 13 and at least a part of the floor brace fastening portion 14 are located on a s substantially straight line that passes through the internal space 18 (see FIGS. 1 to 3).

The pillar fastening portion, the steering member fastening portion, and the floor brace fastening portion 14 are also referred to as a miscellaneous member fastening portion. In the present embodiment, a substantially straight line that connects at least a part of the first steering fastening portion 13 and at least a part of the miscellaneous member fastening portion is inclined in the right-left direction. However, the substantially straight line may extend in the right-left direction.

A front side end of the body central portion 15 of the body portion 10 is located closer to the front side than the second steering fastening portion 21 of the projecting portion 20.

11. Effect (1) According to the aforementioned embodiment, the first steering fastening portion 13 and the miscellaneous member fastening portion contact the internal space 18. For this reason, the external force inputted from the first steering fastening portion 13 is urged to be transmitted to the miscellaneous member fastening portion through the hollow part of the body portion 10. At least a part of the first steering fastening portion 13 and at least a part of the miscellaneous member fastening portion are located on a substantially straight line that passes through the internal space 18. Therefore, when the external force is transmitted from the first steering fastening portion 13 to the miscellaneous member fastening portion through the hollow part of the body portion 10, a transmission path of the external force is urged to be straight, and a change in transmission direction of the external force is inhibited. This makes transmission of the external force more smooth, and can reduce a local stress on the steering support 1. Thus, rigidity of the steering support 1 is improved.

As a result, plate thickness of the steering support 1 can be reduced, and downsizing of the steering support 1 can be achieved. Also, the steering support 1 can be manufactured without using a highly rigid material such as aluminum, and manufacturing cost of the steering support 1 can be reduced.

(2) The floor brace fastening portion 14 is provided to contact the internal space 18. For this reason, the external force inputted from the first steering fastening portion 13 is urged to be transmitted to the floor brace fastening portion 14 through the hollow part of the body portion 10. At least a part of the first steering fastening portion 13 and at least a part of the floor brace fastening portion 14 are located on a substantially straight line that passes through the internal space 18. Therefore, when the external force is transmitted from the first steering fastening portion 13 to the floor brace fastening portion 14 through the hollow part of the body portion 10, a transmission path of the external force is urged to be straight, and a change in transmission direction of the external force is inhibited. This makes transmission of the external force more smooth, and can reduce a local stress on the steering support 1. Thus, rigidity of the steering support 1 is improved.

(3) The floor brace fastening portion 14 is provided in the lower body member 4. For this reason, the steering support 1 and the floor brace 93 can be fastened closer to a fastening position of the floor brace 93 and the body of the vehicle. Therefore, rigidity of the steering support 1 and the floor brace 93 can be improved.

(4) The body central portion 15 of the body portion 10 has a truss structure. For this reason, deformation of the front surface portion 34 and the rear surface portion 35 can be limited, and rigidity of the body portion 10 can be improved.

(5) The front side end of the body central portion 15 is located closer to the front side than the second steering fastening portion 21 provided in the projecting portion 20. For this reasons, the width of the body central portion 15 is increased, and a sufficient area of a welded portion between the upper projecting portion 5 and the lower projecting portion 6 of the body central portion 15 can be secured. Thus, the projecting portion 20 can be joined to the body central portion 15 more strongly. Since the body central portion 15 has an increased width, rigidity of the body portion 10 is improved.

(6) The projecting portion 20, together with the steering 8, is joined to the body portion 10 by the first steering fastening portion 13. For this reason, while an increase in the number of components is limited, joint strength between the projecting portion 20 and the body portion 10 can be improved.

12. Other Embodiments (1) In the aforementioned embodiment, the steering support 1 supports the steering 8 in a driver's seat provided on the left side. However, the steering support 1 can support the steering 8 in the driver's seat provided on the right side by the same configuration as that of the aforementioned embodiment.

(2) The body portion 10 is configured by two members, that is, the upper body member 3 and the lower body member 4. However, the body portion 10 may be configured by one, or three or more members. Even with such a configuration, the same effect can be obtained.

(3) Functions of one element of the aforementioned embodiment may be performed by elements. One function of one element may be performed by elements. Functions of elements may be performed by one element. One function of elements may be performed by one element. Part of the configurations of the above-described embodiments may be omitted. At least one of the configurations of the above-described embodiments may be added to or replaced with the configurations of the other above-described embodiments.

13. Correspondence Relationship Between Words

The driver side pillar 94, the steering member 9, or the floor brace 93 corresponds to one example of the miscellaneous member. The first bolt hole 72 corresponds to one example of the first fastening portion, and the third bolt hole 45 corresponds to one example of the third fastening portion. The right end portion 11, the left end portion 12 or the third bolt hole 45 corresponds to one example of the second fastening portion.

What is claimed is:

1. A steering support configured to be mounted on a vehicle to extend in a vehicle-width direction and configured to support a steering column of the vehicle from above, the steering support comprising:
    a body portion formed by joining plate materials having specified shapes, the body portion having an internal space extending in the vehicle-width direction between the plate materials;
    a first fastening portion provided in the body portion to form a first steering fastening portion, the first steering fastening portion contacting the internal space, and being configured to fasten the body portion and the steering column; and
    a second fastening portion provided in the body portion to form a miscellaneous member fastening portion, the miscellaneous member fastening portion contacting the internal space, and being configured to fasten the body portion and a miscellaneous member of the vehicle,
    at least a part of the first steering fastening portion and at least a part of the miscellaneous member fastening portion being located on a substantially straight line that passes through the internal space,
    the body portion being formed by joining members including a lower body member and an upper body member,
    the lower body member being located on a lower side of the internal space,
    the upper body member facing the lower body member across the internal space,
    the first steering fastening portion being configured to fasten the body portion and the steering column by at least one penetration member that penetrates the lower body member, the upper body member, and the internal space,
    the at least one penetration member having a leading end projecting downward from the lower body member and being configured to be inserted into the steering column,
    a portion of the body portion located substantially in the center in the vehicle-width direction being a body central portion,
    the steering support further comprising a projecting portion provided in the body central portion to project to a front side of the vehicle, the projecting portion having a second steering fastening portion configured to be fastened to the steering column,
    the projecting portion comprising an upper projecting portion and a lower projecting portion facing each other in an up-down direction, the upper projecting portion being arranged on an upper surface of a portion of the upper body member which portion forms the body central portion, the lower projecting portion being arranged on a lower surface of a portion of the lower body member which portion forms the body central portion and having a second steering fastening portion, and
    the at least one penetration member further penetrates the upper projecting portion, the first steering fastening portion joining the projecting portion, the body portion, and the steering column.

2. The steering support according to claim 1, wherein the miscellaneous member is a pillar of the vehicle.

3. The steering support according to claim 2, further comprising:
    a third fastening portion provided in the body portion to form a floor brace fastening portion, the floor brace fastening portion contacting the internal space, and being configured to fasten the body portion and a floor brace, wherein
    the floor brace is an elongated member projecting from a portion of a body of the vehicle located below the steering support, and
    at least a part of the first steering fastening portion and at least a part of the floor brace fastening portion are located on a substantially straight line that passes through the internal space.

4. The steering support according to claim 3, wherein the third fastening portion is provided in the lower body member.

5. The steering support according to claim 2, wherein the miscellaneous member is fastened to a first end of the body portion in the vehicle-width direction, and
    a second end of the body portion in the vehicle-width direction is fastened to a steering member mounted on the vehicle to extend in the vehicle-width direction.

6. The steering support according to claim 1, wherein the miscellaneous member is a steering member mounted on the vehicle to extend in the vehicle-width direction.

7. The steering support according to claim 1, wherein the body portion further comprises a bottom surface portion located on a lower side of the internal space and expanding along a reference bottom surface that is a virtual plane,
    two virtual planes intersecting on an upper side of the bottom surface portion are a reference front surface and a reference rear surface,
    the reference bottom surface, the reference front surface, and the reference rear surface form a triangular section orthogonal to the vehicle-width direction, and
    the body portion has a front surface portion expanding along the reference front surface, and a rear surface portion expanding along the reference rear surface.

8. The steering support according to claim 1, wherein an end on the front side in the body central portion is located closer to the front side than the second steering fastening portion.

9. The steering support according to claim 1, wherein the body portion comprises a body central portion, a body left portion, and a body right portion aligned in the vehicle-width direction,
    the body central portion is located substantially in the center in the vehicle-width direction between the body left portion and the body right portion, and
    each of the body left portion and the body right portion has a shape in which a length thereof in a front-rear direction orthogonal to the vehicle-width direction becomes larger toward the body central portion.

10. The steering support according to claim 9, wherein
the upper body member comprises a rear surface portion and a rear upper surface portion,
the rear upper surface portion is flat and located in a rear portion of the upper body member,
the rear surface portion is flat and projects upward from a front side rim of the rear upper surface portion, and
the at least one penetration member penetrates the rear upper surface portion.

11. The steering support according to claim 1, wherein
the upper body member comprises a rear surface portion and a rear upper surface portion,
the rear upper surface portion is flat and located in a rear portion of the upper body member,
the rear surface portion is flat and projects upward from a front side rim of the rear upper surface portion, and
the at least one penetration member penetrates the rear upper surface portion.

\* \* \* \* \*